Sept. 2, 1941.   J. F. KUBALEK   2,254,948
INSECT KILLING DEVICE
Filed Dec. 13, 1939   2 Sheets-Sheet 1

INVENTOR.
JOHN FRANK KUBALEK
BY Flournoy Corey
ATTORNEY.

Sept. 2, 1941.　　　J. F. KUBALEK　　　2,254,948
INSECT KILLING DEVICE
Filed Dec. 13, 1939　　　2 Sheets-Sheet 2
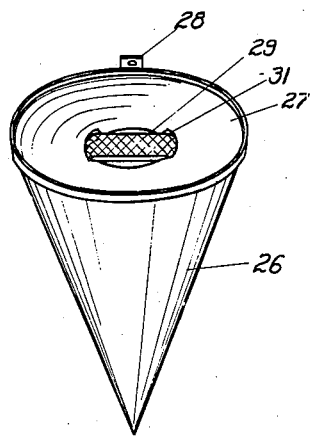
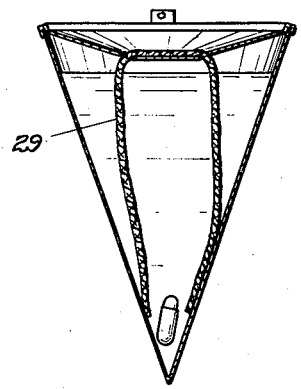
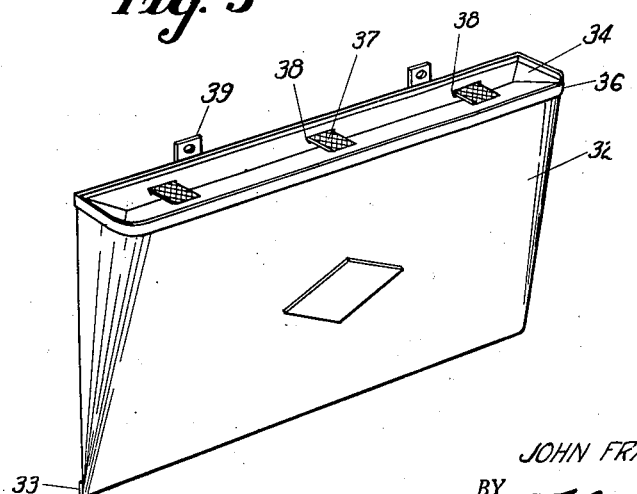
INVENTOR.
JOHN FRANK KUBALEK
BY Flournoy Corey
ATTORNEY.

Patented Sept. 2, 1941

2,254,948

UNITED STATES PATENT OFFICE 2,254,948

INSECT KILLING DEVICE

John Frank Kubalck, Tama, Iowa

Application December 13, 1939, Serial No. 309,023

3 Claims. (Cl. 43—131)

This invention relates to means for exterminating insects and has particular relation to a safety container for dispensing liquid poison.

Numerous devices have been suggested for killing insects and the like. Some of these are of the mechanical type and others use chemicals for poisoning the insects. Devices of the latter type have been found generally unsatisfactory since they are usually of such construction that they may be placed almost anywhere and are frequently within the reach of children.

It is accordingly an object of my invention to provide an improved type of insect killer adapted to utilize a liquid type of poison and still enclose the poison in a relatively tight container so as to make it relatively difficult for children to come into contact with the poison.

Liquid poisons have been generally found to be more attractive to insects for a greater length of time, and therefore more satisfactory in such an insect killer.

It is therefore another object of my invention to provide a simple, inexpensive device of this type in which the poison may be sealed in dry form in the container during manufacture, and which may be prepared for use or renewed by the addition of water.

Another object of my invention is the provision of a device of this character and of such construction as to encourage storing or hanging in such a position and location as to be out of reach of children.

Other and further features and objects of the invention will be more apparent to those skilled in the art upon a consideration of the accompanying drawings and following specifications, wherein are disclosed several exemplary embodiments of the invention, with the understanding, however, that such changes may be made therein as fall within the scope of the appended claims, without departing from the spirit of the invention.

In said drawings:

Figure 3 is a view in perspective illustrating a modified form of the device shown in Figure 1.

Figure 4 is a sectional view of the device showing and illustrating the construction thereof, and Figure 5 is a view in perspective of another modified form of the device.

Figure 1:
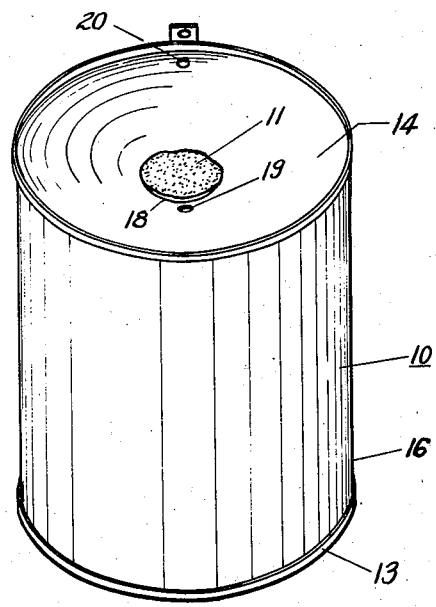
Figure 1 is a view in perspective of the device constructed in accordance with one embodiment of my invention.
Figure 2:
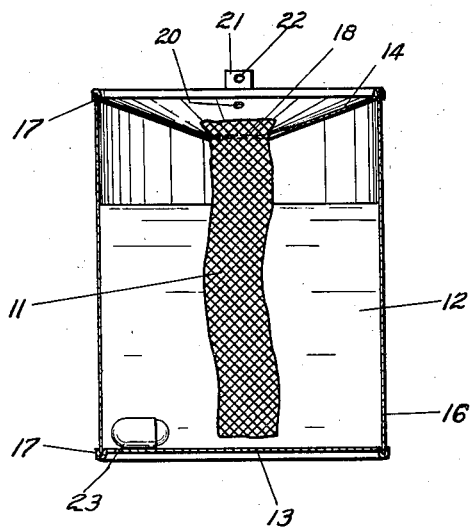
Figure 2 is a view in section illustrating the construction of the device shown in Figure 1.

Referring now to Figures 1 and 2 in particular, the device comprises in general a can-like container, indicated generally at 10, and a wick 11 extending outside of the container and adapted to be wetted by liquid poison 12 within the container. The container shown may include bottom and top members 13 and 14 respectively and a side member 16, all joined together, in accordance with common practice in the making of tin cans, along the edges of the side member 16 by rolling and soldering or the like and as shown at 17.

It is preferable that the top member 14 be conical in shape. The wick 11 is received in an opening 18, preferably near the center of the top member 14 and extending downwardly into the liquid poison 12.

One or more openings, as shown at 19 and 20, are preferably provided around the larger opening 18 to permit water placed within the top cone-like or recessed member 14 to trickle downwardly into the container.

Any suitable liquid poison may be used in the container such as lead arsenate and water. It is preferable that sugar or molasses be also added to the mixture to make it attractive to insects.

To make the device marketable as a unit, the poison and sugar or the like may be supplied in dry form in a water soluble capsule 23 which may be sealed into the can during manufacture. Water may be added to the desired amount by the user when desired. When the water is added, the capsule dissolves, permitting the chemical to form a solution with the water.

It will be apparent that the poison will last practically indefinitely, as only the water will evaporate and may be readily replaced by the user.

In order to keep the container out of the reach of children, it is preferable that it be hung up on the wall out of their reach, and I have therefore provided the tab 21 having a hole 22 therein for mounting upon a nail or hook. The tab 21 may comprise a part of the cover member 14, or a hole may be punched through the upper rim of the container.

In the modified form of the structure shown in Figures 3 and 4 I have provided a different form of wick and have also provided a container of such a shape as to make it impossible to stand it upright on a table or shelf.

In this embodiment of the invention, the container is preferably cone-shaped, having a conical body member 26 and a slightly cone-shaped or recessed cover member 27. It is apparent of course that the main body member 26 may be curved at its lower end if desired, or shaped in any manner suitable for preventing the container from being stood on its lower end. This construction, of course, encourages the user to hang the device on the wall by means of the tab 28.

The cover member 27 in this form of my invention is not provided with a centrally located wick but utilizes a flat wick 29 or a piece of fabric inserted through a pair of slot-like openings 31 to permit both ends of the wick to dip into the liquid poison. The main advantage of a device utilizing a flat wick is that it is less expensive in construction.

The modified form of the invention shown in Figure 5 is more adapted to decorative treatment and may be mounted so as to be relatively inconspicuous. This device is preferably in the form of a wedge-shaped container having side walls 32 joined together along their bottom edges, as at 33, and provided with a recessed cover member 34 flanged and soldered, as at 36, or otherwise fastened to the top edges of the side walls 32.

The cover member is provided with a plurality of wick members 37 mounted through slots 38 in the cover member in the same manner as in the device shown in Figures 3 and 4. One or more tabs 39 may be provided at one side of the container for hanging the device on nails or hooks. In place of the tabs, holes may of course be provided through the flanged rim or, if desired, hook members may be soldered or otherwise fastened to the rear of the container to permit the device to be hung on the wall or on the rear side of a picture frame.

It is apparent that I have provided a device suitable for killing insects which may be manufactured very inexpensively, which may be marketed and handled in a safe manner, and in which the efficiency of the poison medium may be renewed when necessary by the addition of plain water.

It will be further apparent that I have provided a device of such shape as to discourage setting it on a table or shelf or other place where it would be readily available to children.

Although I have described specific embodiments of my invention, it is apparent that modifications thereof may be made by those skilled in the art. Such modifications may be made without departing from the spirit and scope of my invention as set forth in the appended claims.

I claim as my invention:

1. In a device of the character described, a container, a recessed cover fixedly attached thereto, a wick passing through an opening in the cover, a water soluble capsule sealed within the container, and a water soluble poison in the capsule.

2. A new article of manufacture comprising the combination of a container in substantially the shape of an inverted cone for receiving a liquid, a water soluble capsule in the container, said capsule containing a water soluble poison, a recessed cover permanently affixed to the top of the cone to seal the poison capsule therein, the said recessed cover having at least two openings therethrough, a wick extending through at least one of said openings and down into the container, and means for hanging the container.

3. In an insect exterminator, a container for liquid poison, a closure for the top thereof comprising a sheet metal member of substantially frusto-conical form secured in inverted position at the base thereof to the upper edge of the container, the truncated portion of the cone having two openings extending therethrough adjacent the opposite edges thereof, and a flat wick disposed across the upper side of the said cone and down through the said openings into liquid poison within the container.

JOHN FRANK KUBALEK.